(12) United States Patent
Grimm et al.

(10) Patent No.: US 6,387,447 B1
(45) Date of Patent: May 14, 2002

(54) PRESSURE RESISTANT AND HEAT-STABLE INSULATING COATINGS FOR HOLLOW BODIES, AND A METHOD FOR PRODUCING THE SAME

(75) Inventors: Wolfgang Grimm, Leverkusen; Udo Post, Bergisch Gladbach; Elke von Seggern, Langenfeld, all of (DE); Denis Bouvier, Bourgoin-Jallieu (FR)

(73) Assignee: Bayer Aktiengesellschaft, Leverkusen (DE)

( * ) Notice: Subject to any disclaimer, the term of this patent is extended or adjusted under 35 U.S.C. 154(b) by 0 days.

(21) Appl. No.: 09/462,729
(22) PCT Filed: Jul. 3, 1998
(86) PCT No.: PCT/EP98/04105
   § 371 Date: Jan. 11, 2000
   § 102(e) Date: Jan. 11, 2000
(87) PCT Pub. No.: WO99/03922
   PCT Pub. Date: Jan. 28, 1999

(30) Foreign Application Priority Data
   Jul. 16, 1997 (DE) .......................................... 197 30 466

(51) Int. Cl.$^7$ ............................. B32B 27/40; B05D 3/02; C08J 9/32
(52) U.S. Cl. ................. 427/373; 427/385.5; 428/423.1; 428/406; 523/219
(58) Field of Search ............................. 427/373, 385.5; 428/365, 423.1, 406; 523/219

(56) References Cited

U.S. PATENT DOCUMENTS

| 4,182,826 A |   | 1/1980  | Ludke ........................ 528/57 |
| 5,601,881 A |   | 2/1997  | Grimm et al. .............. 427/425 |
| 5,621,043 A | * | 4/1997  | Croft |
| 5,837,739 A | * | 11/1998 | Nowak et al. |

FOREIGN PATENT DOCUMENTS

GB    1209243    10/1970

* cited by examiner

Primary Examiner—Tae H. Yoon
(74) Attorney, Agent, or Firm—Joseph C. Gil; Lyndanne M. Whalen

(57) ABSTRACT

A process for the production of insulating coatings containing polyurethane groups and/or polyisocyanurate groups for hollow bodies by reaction of a) a polyisocyanate component with
  b) compounds which contain at least two hydrogen atoms which are active towards isocyanates and
  c) catalysts, optionally in the presence of
  d) further auxiliary substances and additives, characterised in that organic or mineral hollow microbeads having an average particle size in the range from 5 to 200 $\mu$m and a density in the range from 0.1 to 0.8 g/cm$^3$ are added to at least one of components a) to d), is described.

The use of these insulating coatings for pipes employed in the offshore sector is furthermore described.

9 Claims, No Drawings

PRESSURE RESISTANT AND HEAT-STABLE INSULATING COATINGS FOR HOLLOW BODIES, AND A METHOD FOR PRODUCING THE SAME

This application is a 371 of PCT/EP 98/04105 filed on Jul. 3, 1998.

The invention relates to insulating coatings containing polyurethane groups and/or polyisocyanurate groups for hollow bodies, in particular pipes, and a process for the production thereof.

As is known, PUR foams and PUR elastomers, inter alia, are employed for insulating oil and gas pipelines in the offshore sector.

EP-A 636 467 describes how a thick-layered PUR coating of rotational bodies, such as rolls and pipes. can be carried out in one operation. Inter alia, coating of pipes with syntactic PUR slurries for insulation is also known.

The requirements profile of such insulating materials is increased significantly by the opening-up of new oil fields at deeper sea depths. Inter alia, the heat distortion point of these materials must be increased from previously 120° C. to 160° C. and the compressive strength must be increased from previously 50 bar (500 m immersion depth) up to 250 bar (2.500 m immersion depth).

However, the polyurethane materials described above are limited in long-term heat resistance to approx. 120° C.

The object of the present invention was therefore to discover insulating coatings for pipes, which have a heat distortion point above 120° C. and a compressive strength above 50 bar.

Surprisingly, it has been found that by combination of polyisocyanurate reaction compositions with heat- and pressure-stable hollow microbodies, the desired requirements can be met and the economical rotary coating process mentioned in EP-A 636 467 can be used for straight and slightly curved pipes. Pipe bends and connections can be produced by mould casting on the same raw material basis.

The invention therefore relates to a process for the production of insulating coatings containing polyurethane groups and/or polyisocyanurate groups for hollow bodies by reaction of a) a polyisocyanate component with b) compounds which contain at least two hydrogen atoms which are active towards isocyanates and c) catalysts, optionally in the presence of d) further auxiliary substances and additives, in which organic or mineral hollow microbeads having an average particle size in the range from 5 to 200 μm and a density in the range from 0.1 to 0.8 g/cm³ are added to at least one of components a) to d).

The coatings according to the invention are suitable for rolls or pipes such as are employed in the steel industry, conveying and transportation industry and in the paper industry. Pipes with an external coating for industrial and pipes with an internal coating for hydraulic conveying of abrasive goods can also be produced by this process. If required, the areas to be coated must be provided with an adhesion promoter beforehand.

However, pipes or other hollow bodies can also be produced by the new process by coating a removable core. In this case, a release agent must be applied to the core or a release film must be wound around it. Finally, the new process can also be used to provide pipes with a thermal insulation jacket of rigid polyurethane foam.

It has been found not only that the new process is suitable for internal and external coating of rotationally symmetric bodies, but that bodies which have diameters which differ over the length and/or cross-section can also be coated.

The process according to the invention is particularly suitable for coating pipes for the offshore sector, in particular for pipes for a depth of more than 500 m which are exposed to a pressure load of greater than 50 bar and a temperature of greater than 120° C.

The reaction components are liquid reaction mixtures which react to form massive or foamed, preferably rigid polyurethane plastics, which optionally contain isocyanurate groups. They are mixtures of organic, preferably aromatic polyisocyanates with compounds which contain at least two hydrogen atoms which are active towards isocyanates, in particular organic polyhydroxy compounds, the polyisocyanates being employed in approximately equivalent amounts, based on the hydroxyl groups, for the preparation of pure polyurethanes and being employed in excess amounts for the preparation of isocyanurate-modified polyurethanes. This means that the isocyanate index is in general within the range from 90 to 2,000, preferably 100 to 1,800. "Isocyanate index" here is to be understood as meaning the number of isocyanate groups of the polyisocyanate component per 100 hydroxyl groups of the polyhydroxy component.

Suitable systems which react to give polyurethanes are described. for example, in DE-PS 16 94 138, while systems according to DE-PS 25 34 247 can be employed as casting compositions which react to give isocyanurate-modified polyurethanes.

The customary auxiliary substances and additives, i.e. catalysts for the isocyanate addition reaction, such as dimethylbenzylamine, dibutyltin dilaurate or permethylated diethylenetriamine, catalysts for the trimerization of isocyanate groups of the type described in DE-PS 25 34 247, or fillers, such as, for example, glass fibres, aluminium hydroxide, talc, chalk, dolomite, mica, barite or wollastonite ($CaSiO_3$), can be added to the casting compositions.

However, it is essential to the invention that mineral and/or pressure-resistant, heat-stable plastics having a hollow microstructure are present in the reaction components from 0.5% up to a maximum filling, without generation of additional hollow spaces, based on the total weight of the reaction components.

The maximum filling is calculated as follows:

| | |
|---|---|
| $\rho_{hollow\ body}$ | = density of the hollow microbody |
| $\rho_{bulk}$ | = mean bulk density of the hollow microbodies |
| $\rho_{PUR}$ | = density of the polyurethane matrix |
| Free space | = space remaining between the poured hollow bodies compacted to the maximum |
| Free space | = $\rho_{hollow\ body} - \rho_{bulk}$ |

To achieve flow of the matrix during the reaction, at least 1 wt. % excess matrix must be present with respect to the free space. The maximum filling is thus given by the following formula:

Minimum amount of PUR per 100 g hollow bodies $$\text{Minimum amount of matrix} = \rho_{PUR} * (1/\rho_{bulk} - 1/\rho_{hollow\ bodies}) * 1.01 * 100$$

The minimum PUR matrix calculated from the above formula has a preferred index of between 1,000 and 1,600.

Mineral hollow microbeads are preferably employed. Mineral hollow microbeads in the density range from 0.1 to 0.8 g/cm$^3$ and having an average particle size of 5 to 200 μm and a compressive strength greater than 50 bar are particularly preferred here. Such hollow bodies are commercially obtainable, for example, under the name Q-CEL" (Omya GmbH) and Scotchlite" Glas Bubbles (3M Deutschland GmbH).

For the preparation of the casting compositions, the additives which are essential to the invention can be added either to the polyisocyanate component or to the polyhydroxy component or to both beforehand, and also directly before the reaction.

The production of the insulating layer, preferably on pipes, is carried out either by the rotary coating process described in EP-A-636 467, or by conventional casting in moulds with the corresponding pipe parts as the insert.

The insulating coatings produced according to the invention usually have a density of less than 0.9 g/cm$^3$, preferably a density between 0.5 and 0.8 g/cm$^3$. The thermal conductivity for the insulating coatings produced according to the invention is advantageously less than 0.180 W/m.K. The insulating coatings according to the invention furthermore have a very high pressure resistance of greater than 50 bar and a high heat stability of greater than 120° C.

EXAMPLES

Both pipe coatings obtained by the rotary coating process and those obtained by the conventional casting process are described in the following examples.

General Production Instructions

Components A and B listed in the examples were prepared individually by mixing the individual constituents under mild conditions and then evacuating the mixture for the purpose of degassing before metering. The metering was carried out via special filler-capable low-pulsation metering pumps and needle valves, in a special low-pressure mixing head.

Depending on the process, the reactive mixture was applied to the pipe either via a film nozzle (rotary coating) or a circular nozzle (conventional casting), in some cases with an attached hose. The processing temperatures of the individual components were set at room temperature up to 70° C., depending on the viscosity. The pipes were always at room temperature had been sand-blasted and in some cases had been pretreated with a commercially available adhesion promoter. The moulds employed were either unheated or temperature-controlled at 80° C., in order to accelerate curing of the reactive polyurethane mixture. After removal from the mould and/or merely after cooling to approx. 35° C., the pipes could already be laid on the coating in a corresponding soft bed (wooden bar prism plus 40 mm thick flexible foam strips). The first physical tests were carried out at the earliest 24 hours after the casting process.

1) Pipe Insulating Coating Produced by the Rotary Coating Process

In this case, the reactive polyurethane mixture is poured onto the rotating pipe via a film nozzle passed over the pipe in the direction of the longitudinal axis. The advance of the nozzle is adjusted such that the desired coating thickness is achieved at a constant output.

Steel pipe with an external diameter of 230 mm
Film nozzle of 200 mm width
Output of 12 l/min=8.4 kg/min
Coating thickness of 45 mm
Coating speed of 308 mm/min
Density of the insulating layer 0.7 g/cm$^3$
Pouring time 8–15 seconds
Thermal conductivity 0.14 W/m*K
Pipe speed of rotation 28 rpm In the following examples, both the polyethers employed, the isocyanates and the index were varied.

Example 1

| Component A | | |
|---|---|---|
| 100 | pt. by wt. | polyether, OH number 36, polyaddition of 83% propylene oxide and 17% ethylene oxide to trimethylpropane |
| 2.0 | pt. by wt. | zeolite 50% in castor oil |
| 1.5 | pt. by wt. | activator, solution of alkali metal acetate in diethylene glycol |
| 40 | pt. by wt | hollow glass microbeads, mean density 0.32 g/cm$^3$ |
| Component B | | |
| 150 | pt. by wt. | polyisocyanate with 31.5% NCO |
| 3.0 | pt. by wt. | zeolite 50% in castor oil |
| 45 | pt. by wt. | hollow glass microbeads, mean density 0.32 g/cm$^3$ |
| Index 1,250 | | |

The test for the compressive strength (test specimen: cube of 100 mm edge length) under 200 bar in water at room temperature resulted in a water uptake of less than 3 g for the entire test specimen after a test period of 24 hours. The test for heat stability (test sheets 200×100×10 mm) resulted in no visible changes and no loss in properties during storage for 4 months at 200° C.

Example 2

| Component A | | |
|---|---|---|
| 100 | pt. by wt. | polyether, OH number 56, polyaddition of 100% propylene oxide to glycerol |
| 2.0 | pt. by wt. | zeolite 50% in castor oil |
| 3.5 | pt. by wt. | activator, solution of alkali metal acetate in diethylene glycol |
| 35 | pt. by wt. | hollow glass microbeads, mean density 0.32 g/cm$^3$ |
| Component B | | |
| 150 | pt. by wt. | polyisocyanate with 31.5% NCO |
| 3.0 | pt. by wt. | zeolite 50% in castor oil |
| 45 | pt. by wt. | hollow glass microbeads, mean diameter 0.32 g/cm$^3$ |
| Index 1,250 | | |

Example 3

| Component A | | |
|---|---|---|
| 100 | pt. by wt. | polyether, OH number 36, polyaddition of 83% propylene oxide and 17% ethylene oxide to trimethylpropane |
| 2.0 | pt. by wt | zeolite 50% in castor oil |
| 1.8 | pt. by wt | activator, solution of alkali metal acetate in diethylene glycol |
| 40 | pt. by wt. | hollow glass microbeads, mean density 0.32 g/cm$^3$ |
| Component B | | |
| Prepolymer of 150 | pt. by wt. | polyisocyanate and |
| 12 | pt. by wt. | castor oil, Brasil no. 1, calculated NCO 29% |
| 3.0 | pt. by wt. | zeolite 50% in castor oil |
| 45 | pt. by wt. | hollow glass microbeads, mean density 0.32 g/cm$^3$ |
| Index 1,150 | | |

Example 4

| Component A | | |
|---|---|---|
| 100 | pt. by wt. | polyether, OH number 36, polyaddition of 83% propylene oxide and 17% ethylene oxide to trimethylpropane |
| 2.0 | pt. by wt. | zeolite 50% in castor oil |
| 1.8 | pt. by wt. | activator, solution of alkali metal acetate in diethylene glycol |
| 40 | pt. by wt. | hollow glass microbeads, mean density 0.32 g/cm$^3$ |
| Component B | | |
| Prepolymer of 162 | pt. by wt. | polyisocyanate and |
| 13 | pt. by wt. | castor oil, Brasil no. 1, calculated NCO 29% |
| 3.0 | pt. by wt. | zeolite 50% in castor oil |
| 50 | pt. by wt. | hollow glass microbeads, mean density 0.32 g/cm$^3$ |
| Index 1,250 | | |

Example 5

| Component A | | |
|---|---|---|
| 100 | pt. by wt. | polyether, OH number 56, polyaddition of 100% propylene oxide to glycerol |
| 2.0 | pt. by wt | zeolite 50% in castor oil |
| 3.5 | pt. by wt. | activator, solution of alkali metal acetate in diethylene glycol |
| 35 | pt. by wt. | hollow glass microbeads, mean density 0.32 g/cm$^3$ |
| Component B | | |
| Prepolymer of 150 | pt. by wt. | polyisocyanate and |
| 12 | pt. by wt. | castor oil, Brasil no. 1, calculated NCO 29% |
| 3.0 | pt. by wt. | zeolite 50% in castor oil |
| 45 | pt. by wt. | hollow glass microbeads, mean density 0.32 g/cm$^3$ |
| Index 1,150 | | |

Example 6

| Component A | | |
|---|---|---|
| 100 | pt. by wt. | polyether, OH number 56, polyaddition of 100% propylene oxide to glyceroi |
| 2.0 | pt. by wt. | zeolite 50% in castor oil |
| 3.5 | pt. by wt. | activator, solution of alkali metal acetate in diethylene glycol |
| 35 | pt. by wt. | hollow glass microbeads, mean density 0.32 g/cm$^3$ |
| Component B | | |
| Prepolymer of 162 | pt. by wt. | polyisocyanate and |
| 13 | pt. by wt. | castor oil, Brasil no. 1, calculated NCO 29% |
| 3.0 | pt. by wt. | zeolite 50% in castor oil |
| 50 | pt. by wt. | hollow glass microbeads, mean density 0.32 g/cm$^3$ |
| Index 1,250 | | |

2. Pipe Coating Produced by Mould Casting

In this process, a pretreated pipe section is laid in a mould which has been treated with release agent and is temperature-controlled at 80° C., and the mould is closed, inclined 10° and filled at the lowest point with rising mixture via a hose, until the reacting polyurethane mixture emerges from the mould at the highest point, a gas vent. By clamping the hose and detaching from the mixing head, the mould is closed at the gate and the mixing head can be flushed with component A.

Steel pipe with an external diameter of 230 mm
Coating length 56 cm
Circular nozzle of 22 mm diameter
Output of 10 l/min=7 kg/min
Coating thickness of 45 mm
Density of the insulating layer 0.7 g/cm$^3$
Pouring time 140–200 seconds
Thermal conductivity 0.14 W/m*K
Filling time 135 seconds In the following examples, both the polyethers employed, the isocyanates and the index were varied.

Example 7

| Component A | | |
|---|---|---|
| 100 | pt. by wt. | polyether, OH number 36, polyaddition of 83% propylene oxide and 17% ethylene oxide to trimethylpropane |
| 2.0 | pt. by wt. | zeolite 50% in castor oil |
| 0.6 | pt. by wt. | activator, solution of alkali metal acetate in diethylene glycol |
| 40 | pt. by wt. | hollow glass microbeads, mean density 0.32 g/cm$^3$ |
| Component B | | |
| 150 | pt. by wt. | polyisocyanate with 31.5% NCO |
| 3.0 | pt. by wt. | zeolite 50% in castor oil |
| 45 | pt. by wt. | hollow glass microbeads, mean density 0.32 g/cm$^3$ |
| Index 1,250 | | |

Example 8

| Component A | | |
|---|---|---|
| 100 | pt. by wt. | polyether, OH number 56, polyaddition of 100% propylene oxide to glycerol |
| 2.0 | pt. by wt | zeolite 50% in castor oil |
| 0.9 | pt. by wt. | activator, solution of alkali metal acetate in diethylene glycol |
| 35 | pt. by wt. | hollow glass microbeads, mean density 0.32 g/cm³ |
| Component B | | |
| 150 | pt. by wt. | polyisocyanate with 31.5% NCO |
| 3.0 | pt. by wt. | zeolite 50% in castor oil |
| 45 | pt. by wt. | hollow glass microbeads, mean density 0.32 g/cm³ |
| Index 1,250 | | |

Example 9

| Component A | | |
|---|---|---|
| 100 | pt. by wt. | polyether, OH number 36, polyaddition of 83% propylene oxide and 17% ethylene oxide to trimethylpropane |
| 2.0 | pt. by wt. | zeolite 50% in castor oil |
| 0.6 | pt. by wt. | activator, solution of alkali metal acetate in diethylene glycol |
| 40 | pt. by wt. | hollow glass microbeads, mean density 0.32 g/cm³ |
| Component B | | |
| Prepolymer of 150 | pt. by wt. | polyisocyanate and |
| 12 | pt. by wt. | castor oil, Brasil no. 1, calculated NCO 29% |
| 3.0 | pt. by wt. | zeolite 50% in castor oil |
| 45 | pt. by wt. | hollow glass microbeads, mean density 0.32 g/cm³ |
| Index 1,150 | | |

Example 10

| Component A | | |
|---|---|---|
| 100 | pt. by wt | polyether. OH number 36, polyaddition of 83% propylene oxide and 17% ethylene oxide to trimethylpropane |
| 2.0 | pt. by wt. | zeolite 50% in castor oil |
| 0.6 | pt. by wt. | activator, solution of alkali metal acetate in diethylene glycol |
| 40 | pt. by wt. | hollow glass microbeads, mean density 0.32 g/cm³ |
| Component B | | |
| Prepolymer of 162 | pt. by wt. | polyisocyanate and |
| 13 | pt. by wt. | castor oil, Brasil no. 1. calculated NCO 29% |
| 3.0 | pt. by wt. | zeolite 50% in castor oil |
| 50 | pt. by wt. | hollow glass microbeads, mean density 0.32 g/cm³ |
| Index 1,250 | | |

Example 11

| Component A | | |
|---|---|---|
| 100 | pt. by wt. | polyether OH number 56, polyaddition of 100% propylene oxide to glycerol |
| 2.0 | pt. by wt. | zeolite 50% in castor oil |
| 0.9 | pt. by wt | activator solution of alkali metal acetate in diethylene glycol |
| 35 | pt. by wt. | hollow glass microbeads, mean density 0.32 g/cm³ |
| Component B | | |
| Prepolymer of 150 | pt. by wt. | polyisocyanate and |
| 12 | pt. by wt. | castor oil, Brasil no. 1, calculated NCO 29% |
| 3.0 | pt. by wt. | zeolite 50% in castor oil |
| 45 | pt. by wt. | hollow glass microbeads, mean density 0.32 g/cm³ |
| Index 1,150 | | |

Example 12

| Component A | | |
|---|---|---|
| 100 | pt. by wt. | polyether, OH number 56, polyaddition of 100% propylene oxide to glycerol |
| 2.0 | pt. by wt. | zeolite 50% in castor oil |
| 0.9 | pt. by wt. | activator, solution of alkali metal acetate in diethylene glycol |
| 35 | pt. by wt. | hollow glass microbeads, mean density 0.32 g/cm³ |
| Component B | | |
| Prepolymer of 162 | pt. by wt. | polyisocyanate and |
| 13 | pt. by wt. | castor oil, Brasil no. 1, calculated NCO 29% |
| 3.0 | pt. by wt. | zeolite 50% in castor oil |
| 50 | pt. by wt. | hollow glass microbeads, mean density 0.32 g/cm³ |
| Index 1,250 | | |

What is claimed is:

1. A process for the production of an insulating coating containing polyurethane groups and/or polyisocyanurate groups for a hollow body which has a heat distortion point above 120° C. and a compressive strength above 50 bar comprising applying to the hollow body a reaction mixture comprising
   a) a polyisocyanate component with
   b) a compound which contains at least two hydrogen atoms which are active towards isocyanates and
   c) a catalyst, optionally in the presence of
   d) an auxiliary substance or additive,
in amounts such that an isocyanate index of from 90 to 2,000 is achieved in which mixture organic or mineral hollow microbeads having an average particle size in the range from 5 to 200 $\mu$m and a density in the range from 0.1 to 0.8 g/cm³ had been added to at least one of components a), b), c) or d).

2. The process of claim 1, in which mineral hollow microbeads are added.

3. The process of claim 1 in which hollow microbeads having a compressive strength of more than 10 bar are added.

4. The process of claim 1 in which the hollow body is a pipe.

5. An insulating coating containing polyurethane groups and/or polyisocyanate groups for a hollow body having a heat distortion point above 120° C. and a compressive strength above 50 bar obtained by reacting a mixture comprising
   a) a polyisocyanate component with
   b) a compound which contains at least two hydrogen atoms which are active towards isocyanates and
   c) a catalyst, optionally in the presence of
   d) an auxiliary substance or additive,
in amounts such that an isocyanate index of from 90 to 2000 is achieved which mixture contains hollow microbeads having an average particle size in the range from 5 to 200 $\mu$m and a density in the range from 0.1 to 0.8 g/cm³ during and subsequent to application of the mixture to the hollow body.

6. A pipe for offshore construction applications having the insulating coating of claim 5.

7. The process of claim 2 in which hollow microbeads having a compressive strength of more than 10 bar are added.

8. The process of claim 2 in which the hollow body is a pipe.

9. The process of claim 3 in which the hollow body is a pipe.

* * * * *